United States Patent [19]

Jackson, Jr. et al.

[11] Patent Number: 4,645,802

[45] Date of Patent: Feb. 24, 1987

[54] BLENDS OF BISPHENOL A POLYCARBONATE WITH POLY(ESTER-IMIDES) AND POLY(ESTER-IMIDE-AMIDES)

[75] Inventors: Winston J. Jackson, Jr.; John C. Morris, both of Kingsport, Tenn.

[73] Assignee: Eastman Kodak Company, Rochester, N.Y.

[21] Appl. No.: 818,302

[22] Filed: Jan. 13, 1986

[51] Int. Cl.$^4$ .................... C08L 77/12; C08L 67/02
[52] U.S. Cl. .................... 525/419; 525/439; 525/466
[58] Field of Search ............. 525/419, 433, 439, 467, 525/466; 528/342, 350

[56] References Cited

U.S. PATENT DOCUMENTS 3,733,302  5/1973  Klebe et al. .................... 525/467 X

FOREIGN PATENT DOCUMENTS 973377  10/1964  United Kingdom .

*Primary Examiner*—Theodore E. Pertilla
*Attorney, Agent, or Firm*—John F. Stevens; William P. Heath, Jr.

[57] ABSTRACT

Blends of bisphenol A polycarbonate with poly(ester-imides) and poly(ester-imide-amides). The poly(ester-imides) and poly(ester-imide-amides) contain repeating units from 0 to 95 mol percent of aromatic dicarboxylic acids containing 8 to 16 carbon atoms and having at least three carbon atoms between carboxyl groups or esters thereof, repeating units from 0 to 95 mol % 1,4-cyclohexanedimethanol, repeating units from 5 to 100 mol % trimellitic acid or anhydride, and repeating units from 5 to 100 mol % 4-(aminomethyl)cyclohexanemethanol, and wherein the mol % of the repeating units from the trimellitic acid or anhydride does not exceed the mol % of repeating units from the 4-(aminomethyl)-cyclohexanemethanol.

10 Claims, No Drawings

BLENDS OF BISPHENOL A POLYCARBONATE WITH POLY(ESTER-IMIDES) AND POLY(ESTER-IMIDE-AMIDES)

TECHNICAL FIELD

This invention relates to blends of bisphenol A polycarbonate with poly(ester-imide) and poly(ester-imide-amide) polymers useful as molding plastics and for the production of films and fibers. These plastics are characterized by exceptionally high toughness and the molding plastics, as well as films and fibers, are characterized by high glass transition temperatures and thus high heat resistance.

The poly(ester-imide) and poly(ester-imide-amide) portion of the blends contain repeating units from 0 to 95 mol percent of aromatic dicarboxylic acids containing 8 to 16 carbon atoms and having at least three carbon atoms between carboxyl groups or esters thereof, repeating units from 0 to 95 mol % 1,4-cyclohexanedimethanol, repeating units from 5 to 100 mol % trimellitic acid or anhydride, and repeating units from 5 to 100 mol % 4-(aminomethyl)cyclohexanemethanol, and wherein the mol % of the repeating units from the trimellitic acid or anhydride does not exceed the mol % of repeating units from the 4-(aminomethyl)cyclohexanemethanol.

The polycarbonate portion of blends is derived from the reaction product of bisphenol A (4,4'isopropylidenediphenol) and phosgene, butyl carbonate, or diphenyl carbonate, etc.

BACKGROUND ART

U.S. Pat. No. 3,060,191 and U.S. Pat. No. 3,880,812 disclose poly(alkylene trimellitimides) which are based on trimellitic anhydride (TMA) and aminoalcohols containing 2 to 12 carbon atoms. U.S. Pat. No. 3,944,706 discloses use of poly(ethylene trimellitate imide) as a wire top coat varnish. Essentially all examples are based on the ester imide formed by reaction of TMA with ethanolamine (EA), U.S. Pat. Nos. 3,458,480; 3,459,829; 3,562,219; 3,697,471; 3,929,714; 4,145,334; 4,267,232 and 4,145,351 disclose poly(ester-imides) based on TMA and aliphatic aminoalcohols. All examples are based on TMA and ethanolamine and, in addition, the examples in these patents all contain multifunctional compounds which are required to thermoset the polymers. U.S. Pat. No. 3,793,250 discloses poly(ester-imides) based on TMA and aliphatic aminoalcohols but these polymers also contain the lactam ring. Poly(ester-imides) and an improved process for making the polymers are also disclosed in U.S. Pat. No. 4,245,086. Poly(alkylene trimellitimide) poly(ester-imides) are also disclosed in U.S. Pat. No. 4,012,555 where the polymers are blended with poly(alkylene diimides). Again, all examples are based primarily on the poly(ester-imide) formed by reaction of trimellitic anhydride with ethanolamine.

U.S. Pat. No. 3,880,812, discloses poly(ester-imides) of high molecular weight and processes for preparing the polymers. According to column 3, lines 19–22, "n-hydroxyethyl trimellitic acid imide is the preferred imide" and "preferably comprises at least 90 mol % of the mer units of the polymer." Also, in column 3, line 29 ff, it is disclosed that copolymers "with 10 to 20% of a higher hydroxyalkyl trimellitic acid imide have 20° to 40° C. lower heat deflection temperature than the preferred homopolymer."

U.S. Pat. application Ser. No. 818,301 filed on even data herewith relates to the poly(ester-imides) and poly(ester-imide-amides) used in the present invention. U.S. Pat. application Ser. No. 768,075, filed on 08-21-85, relates to blends of copolyesters and polycarbonates.

DISCLOSURE OF THE INVENTION

This invention includes blends of poly(ester-imides) and poly(ester-imide-amides) with polycarbonates. The poly(ester-imide) and/or poly(ester-imide-amide) portion may be present in amounts of about 5–95% by weight of the composition and the polycarbonate portion may be present in amounts of about 95–5% by weight. The poly(ester-imide) and/or poly(ester-imide-amide) comprises repeating units from trimellitic acid or anhydride and repeating units from 4-(aminomethyl)cyclohexanedimethanol (AMCHM). From 2 to 95 mol % of the repeating units from trimellitic acid or anhydride may be replaced with repeating units from aromatic dicarboxylic acids or esters thereof containing 8 to 16 carbon atoms and having at least 3 carbon atoms between carboxyl groups. Also, 2 to 95 mol % of the repeating units from 4-(aminomethyl)cyclohexanemethanol may be replaced with repeating units from 1,4-cyclohexanemethanol, provided the mol % of the repeating units from trimellitic acid or anhydride does not exceed the mol % of repeating units from the 4-(aminomethyl)cyclohexanemethanol.

It is preferred that the repeating units from the aromatic dicarboxylic acids be selected from terephthalic acid (TPA), 2-methylterephthalic acid, 2-chloro-terephthalic acid, 2,5-dimethylterephthalic acid, 2,5-dichloroterephthalic acid or esters thereof. Up to 20 mol % of the repeating units from the tere-phthalic acids or esters thereof may be replaced with repeating units from other aromatic dicarboxylic acids or esters thereof having 8–16 carbon atoms and having at least 3 carbon atoms between carboxyl groups or aliphatic dicarboxylic acids or esters thereof containing 3 to 20 carbon atoms. Up to 30 mol % of the repeating units from the 1,4-cyclohexanedimethanol (CHDM) may be replaced with repeating units from other aliphatic glycols containing 2 to 10 carbon atoms. Also up to 20 mol % of the repeating units from the 4-(aminomethyl)cyclohexanemethanol may be replaced with repeating units from other aminoalcohols containing 2 to 12 carbon atoms.

It is preferred that at least 70 mol % of the repeating units from 4-(aminomethyl)cyclohexanemethanol are from trans-4-(aminomethyl)cyclohexanemethanol.

The poly(ester-imides) based on trimellitic anhydride and (4-aminomethyl)cyclohexanemethanol have glass transition temperatures and heat deflection temperatures equal to or higher than those poly(ester-imides) based on TMA and EA. In addition, polymers based on (TMA)(AMCHM) imide have unexpectedly higher notched Izod impact strengths than the prior art polymers, i.e., poly(ester-imides) based on the TMA and EA or TMA and 2,2-dimethyl-3-aminopropanol (DAP), at comparable imide content. It should also be noted that the highest notched Izod impact strengths of the poly(ester-imides) based on EA and DAP were obtained using the preformed imides of these aminoalcohols. Attempts to form the imides of these monomers in situ resulted in low molecular weight or brittle molding plastics having very poor color. Surprisingly, the imides based on AMCHM gave higher notched Izod impact strengths and very little color compared to the prior art imides. No poly(ester-imide-amides) based on AMCHM are disclosed in the prior art and no examples of these polymers could be found. Poly(ester-imide-amides) based on AMCHM have notched Izod impact strengths equal to or better than the oly(ester-imides) based on AMCHM.

The poly(ester-imides) are prepared from TPA or its esters, CHDM, TMA and AMCHM, or from the preformed (TMA)(AMCHM) imide. The polymers are prepared using a variety of procedures well known in the art. These polymer processes include reacting in situ the TPA (acid or ester), CHDM, TMA, and AMCHM; reacting the preformed polyester with TMA and AMCHM; reacting the preformed polyester with the preformed (TMA)(AMCHM) imide; and reacting the TPA (acid or ester), CHDM, and the preformed (TMA)(AMCHM) imide. The processes which use the preformed imide (which may be used in the acid-hydroxy form or the ester-hydroxy form) and/or terephthalic acid are the preferred processes for making the polymers. In addition, solid-phase polymerization may also be used to prepare the crystalline polymers of this invention.

The terephthalic acid portion of the modified polymer may vary from about 2 to 95 mol % such that the sum of the trimellitic portion and the dicarboxylic acid portion of the polymer equal 100 mol %. The terephthalic acid portion may be replaced with a substituted terephthalic acid such as 2-methyl-, 2-chloro-, 2,5-dimethyl-, or 2,5-dichloroterephthalic acid. The terephthalic acid portion also may be replaced with up to 20 mol % of other aromatic dicarboxylic acids, such as 2,6-naphthalenedicarboxylic acid, 4,4'-biphenyldicarboxylic acid, or isophthalic acid, or with aliphatic dicarboxylic acids containing 5–20 carbon atoms, such as glutaric, adipic, pimelic, suberic, azelaic, sebacic, or dodecanedicarboxylic acids. Terephthalic acid is preferred.

The trimellitic portion of the modified polymer is always less than or equal to the AMCHM content of the polymer and may vary from about 5 to 98 mol % such that the sum of the trimellitic portion and the dicarboxylic acid portion of the polymer is equal to 100 mol %. The trimellitic portion of the polymer may be obtained from either trimellitic anhydride or trimellitic acid. Trimellitic anhydride is preferred.

The 1,4-cyclohexanedimethanol portion of the modified polymers may vary from 5 to 98 mol % such that the sum of the glycol portion and the amino-alcohol portion equals 100 mol %. The 1,4-cyclohexanedimethanol may consist of the cis isomer or the trans isomer or any mixture thereof. The 70% trans/30% cis CHDM isomer mixture is preferred. The CHDM may also be replaced with up to 30 mol % of an aliphatic glycol containing 2–10 carbon atoms such as ethylene glycol, 1,3-propanediol, neopentyl glycol, 1,4-butanediol, 1,5-pentanediol or 1,6-hexanediol.

The AMCHM portion of the modified polymer may vary from 2 to 95 mol % such that the sum of the glycol portion and the aminoalcohol portion of the polymer is equal to 100 mol % and such that the AMCHM content is always greater than or equal to the TMA content of the polymers. The AMCHM content may exceed the TMA content by up to 95 mol %. Also, and AMCHM may consist of the cis isomer or the trans isomer or any mixture thereof. The preferred isomer mixture contains at least 70 mol % trans isomer. Additionally, up to 20 mol % of the AMCHM portion of the polymer may be replaced with other aminoalcohols such as 2-aminoethanol, 2,2-dimethyl-1,3-aminopropanol, 4-aminobutanol or 6-aminohexanol.

These poly(ester-imides) and poly(ester-imide-amides) are prepared in the melt or by solid-phase polymerization or by a combination of these processes. The polymers have an inherent viscosity of at least 0.4, but preferably 0.6 or more.

The polycarbonate portion of the blend consists of the polycarbonate of 4,4'-isopropylidenediphenol (bisphenol A). Many such polycarbonates are commercially available, and are normally made by reacting bisphenol A with phosgene, dibutyl carbonate, diphenyl carbonate, etc., using production techniques such as melt, solution, or interfacial polymerization well known in the art. The inherent viscosity of the bisphenol A polycarbonate is at least 0.3, but preferably 0.5 or more. Commercially available polycarbonates include Lexan 303 polycarbonate (a polycarbonate of bisphenol A and phosgene, I.V.=0.61) and Merlon M-40 polycarbonate (a polycarbonate of bisphenol A and phosgene, I.V. 0.56).

Generally, blends of two distinctly different polymers are opaque and incompatible with one another. Unexpectedly, we have discovered blends of poly(ester-imides) and poly(ester-imide-amides) based on terephthalic acid, 1,4-cyclohexanedimethanol, trimellitic anhydride, and 4-(aminomethyl)cyclohexane methanol with bisphenol A polycarbonate are compatible. Transparent molding plastics exhibiting a single glass transition temperature, with good impact strength and high heat resistance are possible from the novel blends.

The following examples are submitted for a better understanding of the invention.

All poly(ester-imide) and poly(ester-imide-amide) inherent viscosities are determined in 60/40 (wt/wt) phenol/tetrachloroethane at a concentration of 0.5 g/100 ml. Since the I.V. solvent for the poly(ester-imides) degrades bisphenol A polycarbonate, the inherent viscosities of the polycarbonates and the blends of the poly(ester-imides) and poly(ester-imide-amides) and bisphenol A polycarbonate are determined in 25/35/40 phenol/tetrachloroethane/p-chlorophenol at a concentration of 0.1 g/100 ml.

Polymer glass transition temperatures are determined using a Perkin-Elmer DSC-2 Differential Scanning Calorimeter.

The poly(ester-imides) or poly(ester-imide-amides) and bisphenol A polycarbonate having similar particle or pellet size are dry-blended, dried at 80°–120° C. in a vacuum oven overnight, and extruded and pelletized at 260°–300° C. on a ¾-inch Brabender extruder equipped with a mixing screw and screen pack. The pellets from the blends are dried at 80°–100° C. in a vacuum oven overnight and injection-molded on a 1-oz Watson-Stillman molding machine to give 5×½×⅛-inch flexure bars and D1822 Type L tensile bars. ASTM procedures are used for measuring the tensile strength (ASTM-D1708), Izod impact strength (ASTM D256, Method A), and heat deflection temperature at a load of 264 psi (ASTM D648).

EXAMPLE 1

The following example illustrates the preparation of the poly(ester-imide) containing units from 70 mol % terephthalic acid, 70 mol % 1,4-cyclohexanedimethanol, 30 mol % trimellitic anhydride, and 30 mol % 4-(aminomethyl)cyclohexanemethanol.

A mixture of 122.2 g (0.63 mol) dimethyl terephthalate, 100.8 g (0.7 mol) 1,4-cyclohexanedimethanol, 51.8 g (0.27 mol) trimellitic anhydride, 38.6 g (0.27 mol) 4-(aminomethyl)cyclohexanemethanol, and 0.15 g titanium tetraisopropoxide (100 ppm Ti) is placed in a 1-liter flask equipped with a metal stirrer, an inlet for argon or nitrogen and a short distillation column. The contents of the flask are heated in a Woods' metal bath with stirring under argon at 230° C., for 1 hr. and at 275° C. for ½ hr. A vacuum of 0.5 mm is gradually applied over the next 10 minutes while the bath temperature is increased to 295°–300° C. Full vacuum is maintained for ¾ to 1 hr. The flask is released to argon to give a high melt viscosity, light yellow, clear polymer with an I.V. of 0.79 and a Tg of 120° C.

EXAMPLE 2

The example illustrates the preparation of a poly(ester-imide-amide) containing units from 70 l mol % terephthalic acid, 68.5 mol % 1,4-cyclohexanedimethanol, 30 mol % trimellitic acid, and 31.5 mol % 4-(aminomethyl)cyclohexanemethanol.

A mixture of 104.6 g (0.630 mol) terephthalic acid, 99.8 g (0.693 mol) 1,4-cyclohexanedimethanol, 56.7 g (0.270 mol) trimellitic anhydride, 40.5 g (0.284 mol) 4-(aminomethyl)cyclohexanemethanol, and 0.15 g titanium tetraisopropoxide (100 ppm Ti) are placed in a 1-liter flask equipped with a metal stirrer, an inlet for argon or nitrogen, and a short distillation column. The contents of the flask are heated in a Woods' metal bath with stirring under argon at 220° C. for 1 hr., at 260° C. for 1 hr., and 280° C. for 1 hr., and at 300° C. for ¼ hr. A vacuum of 0.5 mm is gradually applied and maintained for about 1 hr. The flask is released to argon to give a high melt viscosity, light yellow, clear polymer with an I.V. of 0.79 and Tg of 116° C.

EXAMPLE 3

The poly(ester-imide) consisting of 80 mol % terephthalic acid units, 80 mol % 1,4-cyclohexanemethanol units, 20 mol % trimellitic anhydride units, and 20 mol % 4-(aminomethyl)cyclohexanemethanol units is prepared according to the procedure of Example 1 to an I.V. of 0.90. A 70/30 wt/wt poly(ester-imide)/Merlon ® M-40 polycarbonate blend is prepared by dry blending and subsequent extrusion and pelletization at 290° C. The transparent blend has an I.V. of 0.96 and a Tg of 124° C. Bars injection-molded at 290° C. have a notched Izod impact strength of 3.6 ft-lb/in., an unnotched Izod impact strength of 50 ft-lb/in., a tensile strength of 8,700 psi, and a heat deflection temperature of 97° C.

EXAMPLE 4

The poly(ester-imide) consisting of 100 mol % trimellitic anhydride (TMA) units and 105 mol % 4-(aminomethyl)cyclohexanemethanol units (based on TMA units) is prepared according to procedures similar to Example 1 except that no titanium catalyst is used and no vacuum is applied during polycondensation to raise the polymer molecular weight. A 0.3 I.V. poly(ester-imide) is obtained with a Tg of 150° C. A 90/10 wt/wt poly(ester-imide)/Lexan ® 303 polycarbonate blend is prepared as described in Example 3. The transparent, almost colorless blend has an I.V. of 0.64 and a Tg of 149° C. Bars injection-molded at 270° C. have a notched Izod impact strength of 15.8 ft-lb/in., an unnotched Izod impact strength of 59 ft-lb/in., a tensile strength of 11,500 psi, and a heat deflection temperature of 124° C.

In table I which follows, it is shown that transparent molding plastics exhibiting a single glass transition temperature with good impact strength and high heat resistance are possible from the novel blends.

TABLE 1

Molding Plastic Properties of Poly(ester-imide)/Bisphenol A Polycarbonate Blends

| TPA,[a] Mol % | CHDM,[a] Mol % | TMA,[a] Mol % | AMCHM,[a] Mol % | Poly(ester-imide) I.V. | Poly(ester-imide) Tg, °C. | Poly(ester-imide)/Polycarbonate Blend Ratio, Wt/Wt | Blend Tg, °C. | Blend I.V. Before Molding | Blend I.V. After Molding | Izod Impact Strength, Ft-Lb/in. Notched | Izod Impact Strength, Ft-Lb/in. Unnotched | Tensile Strength, 10³ Psi | HDT[b] °C. |
|---|---|---|---|---|---|---|---|---|---|---|---|---|---|
| — | — | — | — | — | — | 0/100[c] | 150 | 0.57 | 0.53 | 15.7 | 58 | 10.2 | 126 |
| 95 | 95 | 5 | 5 | 0.90 | 108 | 50/50[c] | 120 | 0.85 | 0.72 | 14.1 | 48 | 8.5 | 99 |
| 80 | 80 | 20 | 20 | 0.86 | 116 | 70/30[c] | 124 | 0.86 | 0.75 | 3.6 | 50 | 8.7 | 97 |
| 80 | 80 | 20 | 20 | 0.86 | 116 | 50/50[c] | 128 | 0.87 | 0.74 | 17.6 | 62 | 8.9 | 105 |
| 80 | 80 | 20 | 20 | 0.86 | 116 | 30/70[c] | 146 | 0.73 | 0.73 | 16.0 | 58 | 8.7 | 114 |
| 75 | 65 | 25 | 35 | 0.67 | 116 | 50/50[c] | 128 | 0.62 | 0.61 | 10.2 | 49 | 9.1 | 107 |
| 70 | 70 | 30 | 30 | 0.62 | 117 | 70/30[c] | 123 | 0.61 | 0.64 | 1.5 | 16 | 8.4 | 98 |
| 70 | 70 | 30 | 30 | 0.62 | 117 | 50/50[c] | 132 | — | 0.62 | 2.0 | 46 | 9.2 | 105 |
| 70 | 70 | 30 | 30 | 0.67 | 117 | 30/70[c] | 140 | 0.59 | 0.59 | 7.5 | 50 | 9.7 | 114 |
| 50 | 50 | 50 | 50 | 0.68 | 133 | 50/50[d] | 140 | — | — | 1.1 | 56 | 9.7 | 111 |
| 50 | 50 | 50 | 50 | 0.68 | 133 | 30/70[d] | 140 | — | — | 1.0 | 57 | 10.3 | 118 |
| 0 | 0 | 100 | 100 | 0.30 | 150 | 5/95[d] | 149 | 0.64 | 0.61 | 20.0 | 63 | 11.4 | 124 |
| 0 | 0 | 100 | 100 | 0.30 | 150 | 10/90[d] | 149 | 0.64 | 0.60 | 15.8 | 59 | 11.5 | 124 |
| 0 | 0 | 100 | 100 | 0.30 | 150 | 20/80[d] | 148 | 0.56 | 0.56 | 2.1 | 68 | 10.1 | 121 |

[a]TPA = terephthalic acid. CHDM = 70% trans/30% cis 1,4-cyclohexanedimethanol. TMA = trimellitic anhydride. AMCHM = 80% trans/20% cis 4-(aminomethyl)cyclohexanemethanol.
[b]HDT = Heat deflection temperature.
[c]The polycarbonate used in these blends is Merlon ® M-40 polycarbonate (Mobay).
[d]The polycarbonate used in these blends is Lexan ® 303 polycarbonate (G.E.).

Examples 1 and 2 illustrate the preparation of a poly(ester-imide) and a poly(ester-imide-amide) useful in the blends of this invention. The remaining examples illustrate the properties of various compatible blends of poly(ester-imides) or poly(ester-imide-amides) with bisphenol A polycarbonate.

The invention has been described in detail with particular reference to preferred embodiments thereof, but it will be understood that variations and modifications will be effected within the spirit and scope of the invention.

We claim:

1. Composition comprising a blend of about 5–95% by weight of a polycarbonate of 4,4'-isopropylidenediphenol having an inherent viscosity of at least 0.3 and about 95–5% by weight of a polymer comprising repeating units from about 5–98 mol % trimellitic acid or anhydride and repeating units from 4-(aminomethyl)cyclohexanemethanol, the mol % of trimellitic acid or anhydride being no greater than the mol % 4-(aminomethyl)cyclohexanemethanol.

2. Composition of claim 1 wherein 2 to 95 mol % of the repeating units from trimellitic acid or anhydride are replaced with repeating units from aromatic dicarboxylic acids or esters thereof containing 8 to 16 carbon atoms and having at least three carbon atoms between carboxyl groups.

3. Composition of claim 2 wherein 2 to 95 mol % of the repeating units from 4-(aminomethyl)cyclohexanemethanol are replaced with repeating units from 1,4-cyclohexanedimethanol, and wherein the mol % of the repeating units from trimellitic acid or anhydride does not exceed the mol % of repeating units from the 4-(aminomethyl)cyclohexanemethanol.

4. Composition of claim 2 wherein the repeating units from said aromatic dicarboxylic acids or esters thereof are selected from terephthalic acid, 2-methylterephthalic acid, 2-chloroterephthatlic acid, 2,5-dimethylterephthalic acid, 2,5-dichloroterephthalic acid, 2,6-napthalenedicarboxylic acid, 4,4'-biphenyl-dicarboxylic acid or esters thereof.

5. Composition of claim 3 wherein the mol % of repeating units from the 4-(aminomethyl)cyclohexanemethanol is equal to or exceeds by up to 95 mol % the repeating units from the trimellitic acid or anhydride.

6. Composition of claim 4 wherein up to 20 mol % of the repeating units from the terephthalic acids or esters thereof are replaced with repeating units from other aromatic dicarboxylic acids thereof and having at least 3 carbon atoms between carboxyl groups containing 8 to 16 carbon atoms or esters thereof or aliphatic dicarboxylic acids or esters thereof containing 3 to 20 carbon atoms.

7. Compositions of claim 3 wherein up to 30 mol % of the repeating units from the 1,4-cyclohexanedimethanol are replaced with repeating units from other aliphatic glycols containing 2 to 10 carbon atoms.

8. Composition of claim 2 wherein up to 20 mol % of the repeating units from 4-(aminomethyl)cyclohexanemethanol are replaced with repeating units from other aminoalcohols containing 2 to 12 carbon atoms.

9. Composition of claim 3 wherein at least 70 mol % of the repeating units from the 4-(aminomethyl)cyclohexanemethanol are from trans-4-(aminomethyl)cyclohexanemethanol.

10. Composition of claim 2 wherein the repeating units from the aromatic dicarboxylic acid portion of the composition are from terephthalic acid.

* * * * *